United States Patent [19]

Mir et al.

[11] 4,353,715

[45] Oct. 12, 1982

[54] APPARATUS FOR AND PROCESS OF REMOVAL OF SOLVENT VAPORS

[75] Inventors: Leon Mir, Newton; Joseph Zahka, Dracut, both of Mass.

[73] Assignee: Abcor, Inc., Wilmington, Mass.

[21] Appl. No.: 217,435

[22] Filed: Dec. 16, 1980

Related U.S. Application Data

[60] Division of Ser. No. 121,638, Feb. 14, 1980, Pat. No. 4,265,642, which is a continuation of Ser. No. 16,419, Mar. 1, 1979, abandoned.

[51] Int. Cl.³ .............................................. B01D 47/00
[52] U.S. Cl. .......................................... 55/22; 55/85; 55/89; 98/115 SB; 210/651
[58] Field of Search .................... 55/22, 84, 85, 89; 98/115 SB; 210/651

[56] References Cited

U.S. PATENT DOCUMENTS

| | | | |
|---|---|---|---|
| 2,823,763 | 2/1958 | Maslan | 55/22 |
| 3,068,627 | 12/1962 | Sherwood | 55/22 |
| 4,257,783 | 3/1981 | Gutjahr | 98/115 SB |

Primary Examiner—Bernard Nozick
Attorney, Agent, or Firm—Richard P. Crowley

[57] ABSTRACT

A process for and a system of removing volatile vapor solvents, particularly from paint-spray booths and paint dryers, and recovering such solvents, which process comprises: intimately contacting the solvent-laden air with a multiphase scrubbing media, particularly a water stream containing an oil-in-water emulsion or a surfactant or a powdered activated carbon, to capture and to dissolve the solvent vapor in the dispersed phase of the scrubbing media in a gas scrubber; removing the solvent-enriched scrubbing media and concentrating the solvent-enriched scrubbing media employing an ultrafiltration device; stripping the solvent from the concentrated solvent-enriched scrubbing media from the ultrafiltration device to remove and recover the solvent, while recycling the scrubbing media for further contact with fresh solvent-laden air; and recycling the water carrier as a permeate for reuse in contacting the solvent-laden air.

10 Claims, 1 Drawing Figure

APPARATUS FOR AND PROCESS OF REMOVAL OF SOLVENT VAPORS

This is a division of application Ser. No. 121,638, filed Feb. 14, 1980 now U.S. Pat. No. 4,265,642, which application is a continuation of Ser. No. 16,419, filed Mar. 1, 1979 (now abandoned).

BACKGROUND OF THE INVENTION

Volatile solvents are often found in the air, and their removal and optional recovery, where the solvents are valuable, are desirable in that venting of such solvent-laden gases or air to the atmosphere causes pollution and a loss of the solvents. In particular, solvents from solvent-based paints are found in the air of spray booths and paint dryers and ovens. These gases, which may include, for example, volatile hydrocarbons, esters, ethers, alcohols and the like, and particularly, for example, acetone, methylethyl ketone, toluene, xylene, ethyl acetate and other volatile organic vapors, are vented to the atmosphere, causing pollution problems. Various attempts have been made to remove and recover solvents prior to venting to the atmosphere, in order to mitigate pollution problems and, hopefully, to recover such solvents for reuse. However, many of the prior-art methods are complicated, costly and not wholly effective.

It is, therefore, desirable to provide for a system and process which may be employed to remove and recover optionally solvents from solvent-laden gases, particularly solvents from paint-spray booths and oven dryers.

SUMMARY OF THE INVENTION

Our invention comprises a system for the removal of solvents from solvent-laden gases and relates to a process for such removal and optionally for the recovery of such solvents. In particular, our system concerns the removal of volatile organic solvents and recovery of the solvents from paint-spray booths and oven dryers by the capture of the solvents in a dilute, dispersed phase of a multiphase, water-based, scrubbing media, the concentration of the solvent-laden, dilute, dispersed phase by an ultrafiltration unit and the subsequent recovery of the solvent from the concentrated scrubbing media.

Our system provides for the removal and recovery of solvents from solvent-laden gases and provides for the recovery of the solvent and the recycle thereof within the system of the multiphase scrubbing media employed to capture the solvents. The system comprises in combination a gas scrubber which may be any conventional gas-scrubbing means by which an intimate contact is occasioned between an incoming gas; that is, the solvent-laden air, and a liquid, multiphase scrubbing media, as hereinafter described. The system also includes a scrubbing media which is a multiphase scrubbing media, with the carrier or inert phase being water or other permeable, inert, liquid material.

The multiphase media includes an additional phase in which the solvent to be removed and recaptured will be soluble, such as surfactant micelles or oil-in-water emulsions or activated carbon. The solvent-capturing media in the water carrier provides for the solvent to diffuse through the water phase into the micelles. The other media is chosen so that the equilibra has most of the solvent in the solvent-laden gas in solution, compared to that dissolved in the gas. If desired, the media may be chosen so that the solvent adsorbs, rather than dissolves, in the other media. For example, activated carbon particles may be employed and be dispersed in the water phase; for example, with surfactants, where adsorption of the solvent is desired. However and in particular, the multiphase scrubbing means typically comprises water with a surfactant and/or an oil-in-water emulsion, so that micelles are formed and the solvent is diffused and captured within the micelles.

The system also includes an ultrafiltration unit containing a semipermeable membrane which divides the unit into a feed zone and a permeate zone, and which membrane is adapted to permit the passage of the carrying phase of the multiphase scrubbing media, such as water and low-molecular-weight salts, and to concentrate the micelles or the other media phase in the feed zone. Typically the ultrafiltration unit will operate at a low pressure of from about 10 to 200 psig and contain a semipermeable membrane of known material, such as, for example, cellulose acetate or other polymeric material adapted and processed to provide for the desired concentration. The ultrafiltration membrane unit may comprise a plurality of tubes wherein the membrane is cast onto the inside of a woven, resin-reinforced tube.

Our system also includes a solvent-recovery means, whereby the concentrated, solvent-enriched, scrubbing media, which is removed from the ultrafiltration unit, may be treated, so that the solvent is stripped or otherwise removed from the multiphase scrubbing media. For example, where the solvent has been captured within dilute micelles and a water phase employing a surfactant or an oil-in-water emulsion to capture the solvent, the solvent-recovery means may comprise an evaporation or a distillation tower, wherein the solvent is stripped from the micelles through a flash-heating of the concentrated, solvent-enriched, scrubbing media from the ultrafiltration unit at a high temperature to remove the solvent.

The solvent-recovery unit also may comprise means in which chemicals can be added to the concentrated solvent-enriched scrubbing media, so as to capture the solvent from the scrubbing media, such as by breaking the oil-in-water emulsion in which the solvent is retained. This can be accomplished by adding chemicals, such as a strong acid or strong acid salts, to the concentrated, solvent-enriched, scrubbing media, or by other well-known techniques, to coagulate and break emulsions.

Our system provides for a continuous operation, whereby the solvent is directed from a particular solvent area, such as a paint booth or a paint oven, directly into the gas scrubber, wherein the solvent is optionally recovered where the solvent has value and may be reused, and also provides for the recycling of the multiphase scrubbing chemicals for reuse in the scrubbing operation, thereby providing for a continuous process, whereby solvent-laden gases are introduced into the scrubber and the solvents are removed or recovered, while the multiphase scrubbing media is recycled and is continuously employed, thereby providing for a low-cost and efficient system.

Our process provides for a continuous recycling and provides, firstly, for the intimate contact of a solvent-laden gas with a multiphase scrubbing media, so as to capture the solvent from the solvent-laden gas within the scrubbing media, the concentration of the solvent captured in the multiphase scrubbing media in an ultrafiltration unit and the subsequent recovery of the solvent from the concentrated solvent-enriched scrubbing media from the ultrafiltration unit, together with the recycling of the scrubbing media from the ultrafiltration unit and the solvent-recovery means back to the gas scrubber.

In our process, the multiphase scrubbing media typically will comprise water as the carrier media, which water will contain the surfactant to form surfactant micelles with the water, or contain an oil-in-water emulsion which, itself, contains a surfactant. The solvent-laden air from the paint-spray booth or oven, by being placed into intimate contact with the water multiphase scrubbing media, permits the solvent to be concentrated by the dissolving of the solvent in the selected surfactant or oil of the oil-in-water emulsion. The selection of the particular oil-in-water emulsion or the surfactant depends on the vapor nature of the solvent being recovered. However, for typical solvents, such as methylethyl ketone, toluene, xylene and the like, media may comprise nonionic, anionic or cationic surfactants which would form micelles with the water, which surfactants contain an oleophilic portion to which the solvent vapor is dissolved.

The amount of surfactant and/or oil-in-water emulsion employed may vary; for example, from 0.5% by weight of the multiphase scrubbing solution to as much as 20% by weight, but more typically would range from about 2% to 10%. The nature of the multiphase scrubbing media should be such that, after saturation of the solvent within the micelles of the system, or even by adsorption on a particular adsorbent added to the water, such as activated carbon particles or molecular sieve particles, the solvent should be removed easily from the multiphase scrubbing media. Therefore, the surfactant micelles or oil-in-water emulsion should be broken or separated through the use of heat or a chemical precipitation or other techniques; that is, the concentrated solvent-laden, multiphase, scrubbing media containing the solvent derived from the ultrafiltration unit should not be so stable as to make recovery and removal of the solvent difficult, while the particular technique to separate the solvent preferentially should not destroy or render ineffective the scrubbing media, but should be such so that the scrubbing chemicals, the surfactants or the oil of the oil-in-water emulsion may be recycled for reuse in the gas scrubber, to make the process more economical and efficient.

Our invention will be described for the purpose of illustration only in connection with a preferred embodiment; however, it is recognized that various changes and modifications may be made in the process and apparatus as illustrated by those persons skilled in the art.

BRIEF DESCRIPTION OF THE DRAWING

The drawing is a schematic, diagrammatic illustration of an apparatus and process for the removal and recovery of solvent-laden air from a solvent paint-spray booth.

DESCRIPTION OF THE PREFERRED EMBODIMENTS

Figure 1:
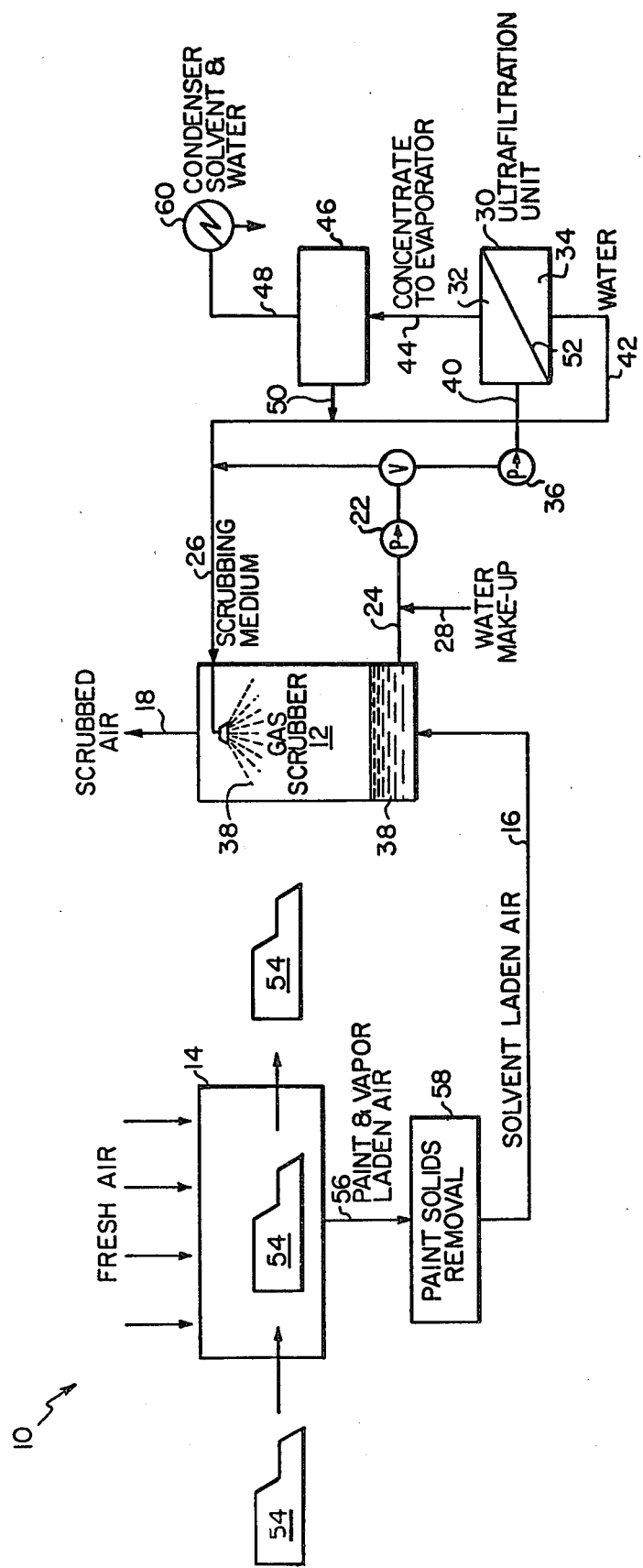

With reference to the drawing, a system 10 is shown which includes a conventional gas scrubber 12, such as a packed bed, column or a column containing sieve trays and packing, spray nozzles or other means by which air, introduced into the gas scrubber 12, is placed into intimate contact with a liquid, multiphase, scrubbing media. The system includes a source of solvent-laden gas, which solvent is desired to be removed from the gas, such as an air stream, typically as illustrated in a paint-spray booth 14, used in a process to paint car bodies 54 via line 56 to paint-solid removal unit 58 and line 16 by which the paint solvents are directed from the paint-spray booth 15 to scrubber 12. The system includes a means to introduce and remove a multiphase scrubbing media 38 into the gas scrubber 12, such as a pump 22, and includes an ultrafiltration membrane unit 30 schematically illustrated to show the formation of a feed zone 32 and a permeate zone 34. The ultrafiltration unit may comprise a plurality of tubes or spiral modules or be a series of ultrafiltration units formed by a membrane 52. The system also includes a solvent-recovery unit 46 by which solvent is removed from the concentrated solvent-laden scrubbing media.

In our system, as illustrated, the scrubbing media comprises a hydrocarbon oil-in-water emulsion which has been stabilized by the addition of typical surfactants, the oil in the emulsion being a hydrocarbon oil, such as a long-chain hydrocarbon or lubricating type of oil, in which the solvent from the paint-spray booth 14 is soluble. Typical solvents to be recovered in the system, as illustrated, would be methylethyl ketone or toluene; although as indicated a wide variety of solvents, such as hydrocarbon solvents of both aliphatic or aromatic type, may be recovered. The multiphase media employed is a water carrier containing the oil-in-water emulsion, with the oil adapted to capture the solvent vapor and representing about 2% to 20% of the multiphase scrubbing media.

In our process, air from the paint-spray booth 14, such as air containing methylethyl ketone or toluene, is directed through line 16 into gas scrubber 12 and is placed into intimate contact in the gas scrubber with the water-based, oil-in-water, multiphase, scrubbing media which is introduced through line 26 by pump 22, while air stripped of the solvent is discharged into the atmosphere through line 18. The multiphase scrubbing media is recycled as shown on a closed-cycle loop through line 26, and additional scrubbing-media makeup is added through line 28, as desired or needed. During the scrubbing of the solvent-laden air with the multiphase scrubbing media, the solvent penetrates the micelles and droplets of the oil-in-water emulsion and is dissolved in the oil portion of the emulsion. The solvent-enriched oil-in-water scrubbing media is then withdrawn from the gas scrubber continuously through line 24 by pump 22, and a portion of the scrubbing media; for example, 5% to 25%; for example, 10%, is introduced by pump 36 through feed line 40 into the feed zone 32 of the ultrafiltration unit 30, the remaining portion of the media; for example, 90%, recycled via line 26 to the gas scrubber 12.

The ultrafiltration unit 30 contains a membrane 52 which is adapted to permit the passage of water or low-molecular-weight salts and other components, but to retain in the feed zone the micelles and droplets of the oil-in-water emulsion or the carbon particles and to concentrate the solvent-enriched, oil-in-water emulsion in the feed zone. Typically the semipermeable membrane may comprise a cast cellulose-acetate membrane or other membrane type which would permit the concentration of the micelles. When the desired concentration is reached, concentrated, solvent-enriched, scrubbing media is withdrawn continuously from the feed zone 32 through line 44 and is introduced into a solvent-recovery tower or means 46, such as an evaporator. The water carrier from the water-scrubbing media 38 and other low-molecular-weight solvents and components, which may pass through the membrane, are removed from the permeate zone 34 and are sent through lines 42 and 26 back to the gas scrubber 12.

In the illustrated solvent-recovery means 46, there is a high-temperature flashing unit, whereby the concentrated solvent mixture or scrubbing media is rapidly heated to vaporize the solvent from the media, and the solvent vapor then is withdrawn through line 48. After withdrawal of the solvent vapor, the solvent may be recovered, if desired, by condenser 60, and subsequent separation may be carried out, if desired, where there are a number of solvents employed. Our system may be employed to recover a number of solvents or a single solvent, depending upon the selection of the scrubbing media and the solubility of the particular solvent to be recovered in the surfactant micelles of the scrubbing media, or, if desired, in an adsorbent media. Thus, in column 46, heat is used to separate the solvent phase. After removal of the solvent phase, the oil-in-water, emulsion is then recycled through line 50 via 42 for use in the gas scrubber 12. Of course, if desired, the solvent-recovery means 26 may comprise also merely a chamber for the addition of acid to break the emulsion to release the solvent from the micelles of the emulsion.

EXAMPLE 1

The process for removing solvent from paint-spray booths is carried out essentially as depicted in FIG. 1.

The car body 54 is sprayed in a spray booth 14 with a lacquer or a dispersion of pigments in a solvent. The solvent consists of a variety of volatile organic compounds, including cellosolves, aromatics and kerosene fractions. About 5 to 20 pounds of solvent evaporate in the spray booth 14 for each car body 54 painted, and about 200,000 to 600,000 cfm of air pass through the booth to maintain the vapor concentration within the booth at tolerable, healthful levels.

The paint solids not impinging on the car body are largely removed in a water through 58 associated with the spray booth. The solvent-laden air, containing about 30 grams of solvent per cubic meter, flows through a packed gas scrubber 12 at a mass velocity of about 1000 lb/ft$^2$ hour. The scrubbing media consists of a 2% to 20% by volume emulsion of oil in water, stabilized by a petroleum-sulfonate surfactant selected to have adequate solubility for the vapor components to be absorbed.

About 20,000 liters per hour of the scrubbing media, containing about 25 grams per liter of solvent, are ultrafiltered in a spiral or tubular ultrafiltration unit 30, to produce a concentrated oil emulsion; 30% to 60% by volume. This concentrated oil emulsion, containing most of the adsorbed solvent vapors, is heated in a boiler as a solvent-recovery means 46 to 100° C. to 120° C., to drive off the solvent vapor and some water, which is condensed in condenser 60 for reuse or disposal.

The solventless concentrated emulsion from the boiler is cooled and is combined with the permeate (water) from the ultrafilter 30 and is returned via 42 to the scrubbing-fluid circuit. By this purpose, the solvent content of the air is reduced by 75% to 95%.

EXAMPLE 2

The process for removing the solvent vapors is again carried out as shown in FIG. 1, but the scrubbing media now consists of a 0.5% to 5% by weight dispersion of powdered activated carbon in water. The solvents are largely adsorbed by the carbon, rather than absorbed by the water.

A slip-stream of the carbon suspension is ultrafiltered by the ultrafiltration unit 30 to produce a concentrate of 15% to 40% by weight of solvent-laden, activated carbon, which is heated 46 to drive off the solvents and some water. As in Example 1, the solvent-depleted concentrate and the UF permeate are combined via 42 and 50 and are returned to the scrubbing circuit. By this process, the solvent content of the air is reduced by about 75% to 95%.

Our process has been illustrated schematically, in the drawing and in the process description, employing a single unit; however, a series of gas scrubbers of various size may be employed as well as a series of ultrafiltration units, while the solvent recovery may comprise one or more solvent-recovery means with associated equipment.

What we claim is:

1. A process for the removal of a volatile organic solvent from a solvent-laden air stream, which process comprises:
    (a) intimately contacting and scrubbing the solvent-laden air stream with an aqueous, multiple-phase scrubbing media to provide a solvent-lean air stream and a solvent-rich scrubbing media, the scrubbing media comprising a surfactant-dispersed, activated carbon or molecular-sieve particles, which particles adsorb the solvent from the solvent-lean air stream, to form a solvent-rich scrubbing media;
    (b) discharging the solvent-lean air stream;
    (c) concentrating the solvent-rich scrubbing media in a low-pressure ultrafiltration-membrane unit having a feed zone and a permeate zone separated by a membrane which permits the passage of water, but retards the passage of the dispersed activated carbon or molecular-sieve particles of the scrubbing media, to provide a concentrated, solvent-rich scrubbing media in the feed zone and permeate water which passes through the membrane into the permeate zone;
    (d) heating the concentrated, solvent-rich scrubbing media to a temperature to remove the solvent from the activated carbon or molecular-sieve particles of the concentrated, solvent-rich scrubbing media, to form a solvent vapor and a concentrated, solvent-lean scrubbing media;
    (e) recovering the solvent vapor; and
    (f) continuously recycling the concentrated, solvent-lean scrubbing media and the permeate water from the permeate zone for use in the contacting and scrubbing of the solvent-lean air stream, to reconstitute a scrubbing media for use in the contacting and scrubbing steps,
whereby the volatile organic solvent is condensed, a solvent-lean air stream is discharged and the multiple-phase scrubbing media is continuously recycled and reused in removing the solvent from the solvent-laden air stream.

2. The process of claim 1 wherein the volatile solvent comprises acetone, methylethyl ketone, toluene, xylene, benzene, ethyl acetate and mixtures thereof.

3. The process of claim 1 wherein the solvent-laden air stream is derived from a paint-spray booth or oven.

4. The process of claim 1 which includes introducing water or make-up scrubbing media to the scrubbing media to make up for loss of water or scrubbing media, prior to contacting and scrubbing the solvent-laden air stream.

5. The process of claim 1 which includes reconstituting the scrubbing media by admixing the recycled permeate water and the recycled, concentrated, solvent-lean scrubbing media, prior to the contacting and scrubbing steps.

6. The process of claim 1 wherein the multiple-phase scrubbing media used in the contacting and scrubbing steps comprises from about 0.5% to 5% by weight of activated carbon or molecular-sieve particles.

7. The process of claim 1 wherein the concentrated, solvent-rich scrubbing media comprises from about 15% to 40% by weight of the solvent-adsorbed activated carbon or molecular-sieve particles.

8. The process of claim 1 wherein recovering the solvent comprises condensing the solvent.

9. The process of claim 1 wherein the surfactant in the dispersed scrubbing media comprises from about 0.5% to 20% by weight.

10. The process of claim 1 wherein the concentrated, solvent-rich scrubbing media in the feed zone contains from 15% to 40% by weight of activated carbon particles.

* * * * *